Aug. 28, 1956  J. A. RUNGE  2,760,292
EYELET CONSTRUCTION
Filed Jan. 26, 1953
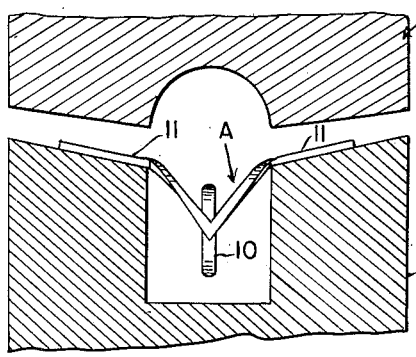
FIG.1.
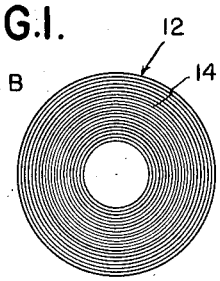
FIG.5.
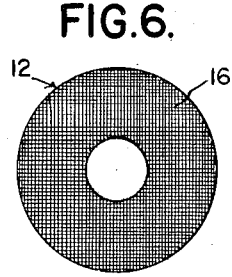
FIG.6.
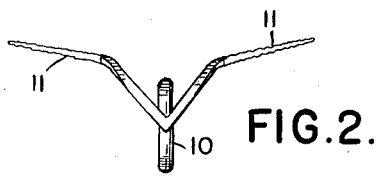
FIG.2.
FIG.7.
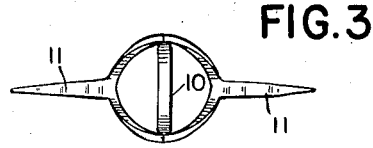
FIG.3.
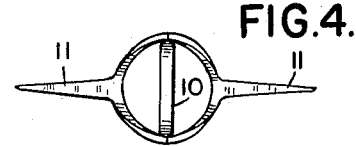
FIG.4.
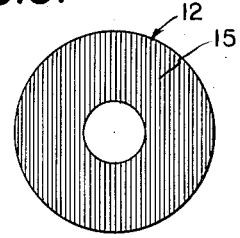
FIG.8.
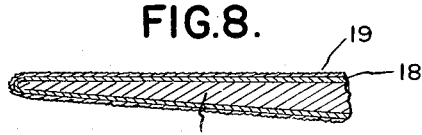
FIG.9.
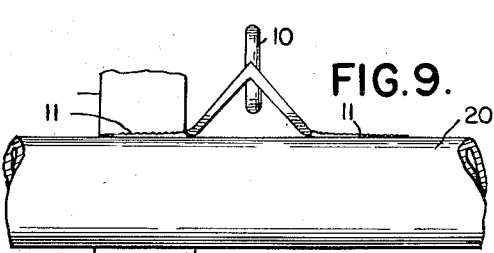
FIG.10.
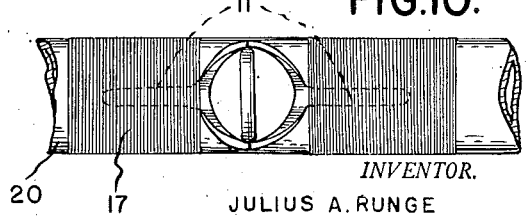
INVENTOR.
JULIUS A. RUNGE
BY
Hauke & Hardesty
ATTORNEYS

United States Patent Office 2,760,292
Patented Aug. 28, 1956

2,760,292

EYELET CONSTRUCTION

Julius A. Runge, Detroit, Mich.

Application January 26, 1953, Serial No. 333,175

3 Claims. (Cl. 43—24)

This invention relates to a fishing rod construction and more particularly to a chrome plated eyelet construction and to the method of bonding same to a fishing rod.

In the assembly of chrome plated eyelets to a fishing rod, it is necessary to grind off the plating underneath the eyelet foot so that same can be welded to a steel rod. While the chrome plating on these eyelet structures is not a heavy plate, in fact it is merely a flash plating, it will prevent the welding of these feet to the rod with the voltage permissible in this particular application. Great care must be exercised in welding these eyelets or guides to a fishing rod since it is quite possible to make the rod brittle with the use of a high voltage current. However, with the roughened surface on the surface of the feet of said eyelet structure which is to be bonded to the fishing rod, the eyelet structure is readily welded with a relatively low voltage current without removing the chrome plating from this roughened surface and without causing the rod to become brittle at the weld.

It is an object of the present invention to simplify the manufacture of articles in which a plated element is to be bonded to another ferrous or non-ferrous element by providing a surface of one of said plated elements with closely spaced points and/or ridges to facilitate the bonding together of such elements.

A further object of this invention is to provide an improved process for welding elements together by roughening one of the contacting surfaces prior to chrome plating comprising the welded joint.

For a more detailed understanding of the invention, reference may be had to the accompanying drawing illustrating a preferred embodiment of the invention in which like characters refer to like parts throughout the several views, and in which—

Fig. 1 is a view in elevation of an eyelet structure showing same located in a die where the feet are flattened to provide a tapered construction and to produce a roughened surface to the underside of the feet.

Fig. 2 is an elevational view of the eyelet structure after the same is removed from the die shown in Fig. 1.

Fig. 3 is a plan view of the same eyelet structure.

Fig. 4 is a plan view of the eyelet before the same is operated on by the dies of Fig. 1.

Figs. 5, 6 and 7 are detail plan views of various types of dies employed to roughen the underside of the feet of said eyelet structures.

Fig. 8 is a fragmentary enlarged sectional view of a foot of said eyelet structure.

Fig. 9 illustrates the welding of the eyelet structure to a ferrous rod.

Fig. 10 is a view in elevation showing the final assembly of the eyelet structure to a fishing rod.

The eyelet structure A is as illustrated, comprised of an eye portion 10 and a base portion having oppositely extending feet 11, these feet being normally tapered in plan as shown in Fig. 4, at least one of these feet being welded or bonded to the smooth surface of a fishing rod as diagrammatically illustrated in Fig. 9.

In order to best facilitate the winding of a silk or nylon cord about the rod and feet as illustrated in Fig. 10, the said feet are formed very thin with a vertical taper as well (see Figs. 1, 2 and 3). This is accomplished by placing the eyelet structure, prior to finish plating same, in a die structure B having a pair of upper and lower die portions 12 and 13, which will squeeze the feet and form the thickness taper to these feet portions as illustrated in Fig. 2.

The upper die portion 12 is purposely roughened, the rough surface of the die being fine annular serrations 14 as shown in Fig. 5, parallel straight serrations 15 as shown in Fig. 7, or cross hatched knurling 16 as shown in Fig. 6. Such roughened surfaces may be of any suitable design, regular or irregular, it being desired to impress the roughened surface of the die into the under surface of the feet to provide a surface 16 having a plurality of closely spaced points and/or ridges. This is substantially a finely roughened surface. The upper surface of these feet may be similarly roughened if so desired to facilitate the winding of the silk or nylon cord 17 thereon, these cords adhering more firmly to a roughened surface than to a smooth surface.

After these eyelet structures are stamped with the roughened under surface to said feet, the eyelet structure is plated first with nickel or silver as at 18 and then with chrome 19. Such plates are very, very thin, merely a flash plating, and the roughened surface of the feet is still present after plating.

These eyelet structures are thus placed on the rod 20 and welded thereto as shown in Fig. 9, the plated roughened surface of the feet being thoroughly bonded to the ferrous rod. When applying these eyelet structures to a glass rod or other similar non-ferrous rod, the feet 11 are cemented to the rod and a good bond is secured. The welding or cementing of the eyelet structures respectively to a ferrous or non-ferrous rod is had without grinding off the chrome plating from the under surface of the eyelet structures, as has been the practice heretofore.

It is here pointed out that previous to the innovation of the roughened contact surface, these chrome plated eyelets were never securely bonded to the rod without first grinding off the plated surface right down to the base metal. The present invention has eliminated an operation in the assembly of these eyelets to a fishing rod, has thus speeded up the assembly, and has made for more economical manufacture.

It will be apparent to those skilled in the art to which this invention pertains that various changes and modifications may be made therein without departing from the spirit of the invention or from the scope of the appended claims.

I claim:

1. A chrome plated eyelet adapted to be secured to a fishing rod comprising an eye portion and a metallic base structure having oppositely laterally extending relatively thin feet having a chrome plated under surface adapted to be disposed flush against the surface of a metallic fishing rod, said feet having a lesser cross-sectional area than that of said rod, said feet being roughened to provide a roughened chrome plated surface comprising said under surface, to facilitate the electric welding of said plated eyelet to the fishing rod, whereby a relatively low voltage welding current may be employed.

2. A chrome plated eyelet structure for a metallic fishing rod comprising a metallic base structure having oppositely laterally extending relatively thin feet adapted to be secured to said fishing rod, said feet having a chrome plated under surface adapted to be disposed flush against the surface of said metallic fishing rod, said feet having a lesser cross-sectional area than that portion of the fishing rod to which said eyelet is secured, each of said feet being progressively tapered in thickness towards the outer end thereof and terminating in a very thin pointed end portion, said under surface of said feet being defined by a roughened chrome plated surface adapted to abut the surface of said rod, whereby the electric welding of said chrome plated eyelet structure to the fishing rod may be performed by means of a relatively low voltage electric current.

3. A chrome plated eyelet structure adapted to be secured to a fishing rod comprising a metallic base structure having oppositely extending relatively thin feet having a lesser cross-sectional area than that of the rod portion to which said feet are secured, said under surface of said feet being provided with a relatively fine roughened chrome plated surface adapted for contact with said fishing rod and having a plurality of very closely spaced chrome plated points and ridges, whereby to facilitate the electric welding of said chrome plated eyelet structure to said fishing rod.

References Cited in the file of this patent

UNITED STATES PATENTS

| | | |
|---|---|---|
| 234,812 | Richardson | Nov. 23, 1880 |
| 911,119 | Farr | Feb. 2, 1909 |
| 958,775 | Shakespeare | May 24, 1910 |
| 1,444,063 | Davis | Feb. 6, 1923 |
| 1,712,507 | Lawson | May 14, 1929 |
| 2,013,185 | Powell | Sept. 3, 1935 |
| 2,227,868 | Tengel | Jan. 7, 1941 |
| 2,300,400 | Axline | Nov. 3, 1942 |
| 2,314,902 | Shepard | Mar. 30, 1943 |
| 2,394,706 | Makie | Feb. 12, 1946 |
| 2,427,727 | Huntley et al. | Sept. 23, 1947 |
| 2,490,548 | Schultz | Dec. 6, 1949 |
| 2,544,238 | Ritter | Mar. 6, 1951 |
| 2,609,598 | Mason | Sept. 9, 1952 |